United States Patent [19]
Strolle et al.

[11] Patent Number: 5,745,635
[45] Date of Patent: Apr. 28, 1998

[54] ADAPTIVE DEEMPHASIS AND REEMPHASIS OF HIGH FREQUENCIES IN VIDEO TAPE RECORDING, UTILIZING A RECORDED CONTROL SIGNAL

[75] Inventors: Christopher H. Strolle, Glenside, Pa.; Raymond A. Schnitzler, Highland Park, N.J.

[73] Assignee: SamSung Electronics Co., Ltd., Suwon, Rep. of Korea

[21] Appl. No.: 8,813

[22] Filed: Jan. 25, 1993

Related U.S. Application Data

[63] Continuation-in-part of Ser. No. 604,494, Oct. 26, 1990, abandoned.

[51] Int. Cl.$^6$ ...................................................... H01N 5/76
[52] U.S. Cl. ............................................ 386/9; 386/27
[58] Field of Search ............................ 358/335, 39, 31, 358/21 R, 11, 310, 330; H04N 5/76, 9/79

[56] References Cited

U.S. PATENT DOCUMENTS

| | | | |
|---|---|---|---|
| 4,318,126 | 3/1982 | Sassler | 348/385 |
| 4,831,463 | 5/1989 | Faroudja | 358/310 |
| 5,113,262 | 5/1992 | Strolle et al. | 358/310 |

FOREIGN PATENT DOCUMENTS

| | | |
|---|---|---|
| 0015499 A1 | 9/1980 | European Pat. Off. |
| 1 230 467 | 12/1966 | Germany |

*Primary Examiner*—Andrew Faile
*Attorney, Agent, or Firm*—Robert E. Bushnell, Esq.

[57] ABSTRACT

A video signal recording system is disclosed which includes a circuit for generating a control signal representative of the level of the high-frequency portion of a full-bandwidth luminance signal. An adaptive deemphasis circuit reduces the level of the high-frequency portion of the luminance signal in response to the control signal. A folding circuit folds the high-frequency portion of the deemphasized luminance signal into the low-frequency portion. The folded deemphasized luminance is combined with the control signal and recorded on the video tape. A video signal playback system is disclosed which includes a circuit for separating the previously recorded control signal from the previously recorded folded deemphasized luminance signal. An unfolding circuit unfolds the played back luminance signal to produce a wide bandwidth deemphasized luminance signal. An adaptive reemphasis circuit boosts the level of the high-frequency portion of the unfolded luminance signal in response to the separated control signal.

31 Claims, 6 Drawing Sheets

|  |  | START OF | COLOR SUB-CARRIER | PHASE ALT CARRIER |
|---|---|---|---|---|
| FR1 | FLD1 | LINE 1 | 0° | 0° |
|  | FLD2 | LINE 263 | 0° | 0° |
| FR2 | FLD1 | LINE 1 | −180° | 0° |
|  | FLD2 | LINE 263 | −180° | 0° |

PHASES OF THE 3.58 MHz COLOR SUBCARRIER AND
OF THE PHASE ALTERNATING CARRIER (PAC)

TABLE I

|  |  |  | 3.58 MHz COLOR SUB- CARRIER | 629 KHz COLOR- UNDER CARRIER | 629 KHz SECOND- UNDER CARRIER | | 3.58 MHz PAC | 4.21 MHz CARRIER |
|---|---|---|---|---|---|---|---|---|
| FR1 FLD1 | LINE | 1 | 0° | 0° | IP | 0° | 0° | 0° |
|  | LINE | 2 | 180° | 270° | OP | 90° | 0° | 90° |
|  | LINE | 3 | 0° | 180° | IP | 180° | 0° | 180° |
|  | LINE | 4 | 180° | 90° | OP | 270° | 0° | 270° |
|  | LINE | 5 | 0° | 0° | IP | 0° | 0° | 0° |
|  | ⋮ |  |  |  |  |  |  |  |
|  | LINE | 262 | 180° | 270° | OP | 90° | 0° | 90° |
| FLD2 | LINE | 263 | 0° | 0° | IP | 0° | 0° | 0° |
|  | LINE | 264 | 180° | 90° | OP | 270° | 0° | 270° |
|  | LINE | 265 | 0° | 180° | IP | 180° | 0° | 180° |
|  | LINE | 266 | 180° | 270° | OP | 90° | 0° | 90° |
|  | LINE | 267 | 0° | 0° | IP | 0° | 0° | 0° |
|  | ⋮ |  |  |  |  |  |  |  |
|  | LINE | 525 | 0° | 180° | IP | 180° | 0° | 180° |
| FR2 FLD1 | LINE | 1 | 180° | 180° | OP | 0° | 0° | 0° |
|  | LINE | 2 | 0° | 90° | IP | 90° | 0° | 90° |
|  | LINE | 3 | 180° | 0° | OP | 180° | 0° | 180° |
|  | LINE | 4 | 0° | 270° | IP | 270° | 0° | 270° |
|  | LINE | 5 | 180° | 180° | OP | 0° | 0° | 0° |
|  | ⋮ |  |  |  |  |  |  |  |
|  | LINE | 262 | 0° | 90° | IP | 90° | 0° | 90° |
| FLD2 | LINE | 263 | 180° | 180° | OP | 0° | 0° | 0° |
|  | LINE | 264 | 0° | 270° | IP | 270° | 0° | 270° |
|  | LINE | 265 | 180° | 0° | OP | 180° | 0° | 180° |
|  | LINE | 266 | 0° | 90° | IP | 90° | 0° | 90° |
|  | ⋮ |  |  |  |  |  |  |  |
|  | LINE | 525 | 180° | 0° | OP | 180° | 0° | 180° |

IP INDICATES COLOR AND SECOND UNDER CARRIERS ARE IN-PHASE;
OP INDICATES COLOR AND SECOND UNDER CARRIERS ARE OUT-OF-PHASE.

CARRIER PHASING

TABLE II

*Fig. 8*

ADAPTIVE DEEMPHASIS AND REEMPHASIS OF HIGH FREQUENCIES IN VIDEO TAPE RECORDING, UTILIZING A RECORDED CONTROL SIGNAL

This is a continuation-in-part of application Ser. No. 07/604,494 filed 26 Oct. 1990 now abandoned.

The present invention relates to a system for transmitting a wide-bandwidth luminance signal through a narrow-bandwidth channel in a backward-compatible manner.

BACKGROUND OF THE INVENTION

In current video cassette recorder (VCR) systems, a relatively wideband video signal is recorded on a relatively narrow bandwidth medium, the video tape. This is done by bandwidth limiting the recorded luminance signal before recording it (and the chrominance signal) on the video tape. This bandwidth limiting results in a degraded image when the previously recorded signal is reproduced and displayed.

Various techniques have been developed to enable the full-bandwidth luminance signal to be recorded on the narrow-band video tape. One of these techniques involves heterodyning a high-frequency portion of the luminance signal into an unused part of the low-frequency portion of its spectrum, a technique called "spectrum folding" (or, more simply, "folding"). This folded-spectrum, or "folded", luminance signal is combined with the chrominance component of the video signal, and the combined signal is recorded on the video cassette. The combined signal contains all the information present in the full-bandwidth video signal, but occupies (along with the chrominance signal) a bandwidth no wider than the relatively narrow bandwidth of the standard video tape. The previously recorded full-bandwidth video signal is subsequently regenerated during playback by separating the chrominance signal from the folded luminance signal, unfolding the folded luminance signal to restore the luminance signal to the form in which it extends over its full-bandwidth spectrum, and recombining the chrominance signal with the restored full-bandwidth luminance signal.

One problem with VCRs utilizing folding techniques is that a video cassette which has been recorded using the folding technique is not backward-compatible with VCRs without the unfolding playback circuitry. That is, a video cassette on which a folded full-bandwidth video signal is recorded can not be played-back on a VCR which does not have the unfolding circuitry in the playback path without introducing objectionable artifacts.

A previous solution to this problem has been to reduce the amplitude of the high-frequency portion of the luminance signal, before it is folded into the low-frequency component, a technique called "deemphasis". The deemphasized folded, luminance signal is then combined with the chrominance signal and the combined signal recorded on the video tape. Upon playback, the folded deemphasized luminance signal is separated from the chrominance signal. The separated luminance signal is then unfolded, and the amplitude of the high-frequency portion is increased to restore it to its original level, a technique called "reemphasis". If such a video tape is played back on a VCR which does not have the unfolding and reemphasis circuitry, the artifacts caused by the presence of the high-frequency portion of the luminance signal within the low-frequency portion are not objectionable, because the amplitude of high-frequency portion of the luminance signal, which causes the artifacts, was reduced to a non-objectionable level prior to folding.

In U.S. Pat. No. 5,113,262, issued 12 May 1992 to the inventors hereof and to others, entitled VIDEO SIGNAL RECORDING SYSTEM ENABLING LIMITED BANDWIDTH RECORDING AND PLAYBACK and incorporated by reference into this specification, a video signal recording system is described that modifies VHS video cassette recording by folding the spectrum of a 5 MHz bandwidth luminance signal to frequency-modulate the luminance carrier, the modulation sidebands of which are higher in frequency than an accompanying color-under signal. A motion signal is derived descriptive of the frame-to-frame changes in the luminance signals, is used for controlling adaptive filtering of the luminance signal during recording, and is recorded for controlling adaptive filtering of the luminance signal during playback.

The video signal recording system described in U.S. Pat. No. 5,113,262 includes an adaptive deemphasis circuit in the record path for luminance signal and an adaptive reemphasis circuit in the playback path for luminance signal. The adaptive deemphasis circuit includes circuitry for detecting the level of the high-frequency portion of the luminance signal and includes circuitry for variably reducing the level of the high-frequency portion in response to the detected signal level. If the level of the high-frequency portion of the luminance signal is high, then the level of the high-frequency portion is reduced by a maximum amount; if the level is low, then the level is reduced by a minimum amount. The adaptive reemphasis circuit in the playback path performs substantially the inverse operation. This adaptive reemphasis circuit includes circuitry for detecting the level of the high-frequency portion of the unfolded luminance signal, and circuitry for variably increasing the level of the high-frequency portion in response to the detected level. If the level of the high-frequency portion of the unfolded luminance signal is relatively high, then the level is boosted by the maximum amount; if the level is relatively low, then the level is boosted by the minimum amount.

Because when the level of the high-frequency portion of the luminance signal is high it is reduced by a maximum amount and when it is low it is reduced by a minimum amount, the level of the high-frequency portion is controlled to always be at about the same level. This deemphasized luminance signal is then folded, recorded, played back and unfolded. All of these steps may introduce noise. The introduced noise is perhaps 6 dB higher in a low-cost system than in a top-quality system, being usually at least 35 dB down from the full dynamic range of the luminance signal in a top-quality system. To the extent the introduced noise appreciably changes the detected level of the high-frequency portion, then, the reemphasis function is not substantially the inverse of the deemphasis function.

It is desirable to produce the highest quality image possible in a VCR with unfolding circuitry in the playback path, while maintaining backward compatibility with VCRs that do not have unfolding circuitry in the playback path. This requires that the amount by which the high-frequency portion of the luminance signal is reduced in the record path substantially corresponds to the amount by which the high-frequency portion of the luminance signal is increased in the playback path. It is, therefore, desirable to increase the correspondence between the deemphasis and reemphasis functions.

The invention provides for recording on the video tape a control signal used for controlling the deemphasis function during recording, to be reproduced during playback for controlling the reemphasis function. The control signal could be placed in an additional track recorded and played back using heads with a different azimuth angle. It is preferable, however, to multiplex the control signal into the modified VHS video signal described in U.S. Pat. No. 5,113,262 to avoid the need for further heads for recording and playback.

SUMMARY OF THE INVENTION

In accordance with principles of the present invention, a video signal recording system includes a circuit for generating a control signal representative of the level of the high-frequency portion of a full-bandwidth luminance signal. An adaptive deemphasis circuit reduces the level of the high-frequency portion of the luminance signal in response to the control signal. The deemphasized luminance is combined with the control signal and recorded on the video tape.

In accordance with further principles of the present invention, a video signal playback system includes a circuit for separating the previously recorded control signal from the previously recorded deemphasized luminance signal. An adaptive reemphasis circuit boosts the level of the high-frequency portion of the unfolded luminance signal in response to the separated control signal.

A video signal recording system in accordance with principles of the present invention will maintain more accuracy between the deemphasis of the recorded video signal and the reemphasis of the played back luminance signal because the control signal used to deemphasize the recorded luminance signal is recorded and used to reemphasize the played back luminance signal.

BRIEF DESCRIPTION OF THE DRAWINGS

FIG. 6 is a diagram showing the chroma vector resolved from the respective I and Q signals and relative positions of the auxiliary signals in one embodiment of the invention.

FIGS. 7 and 8 are tables of phasing relationships between various carrier waves used in the color-under and second under signal portions of the under signal recorded on video tape in certain embodiments of the invention.

DETAILED DESCRIPTION

Figure 1:
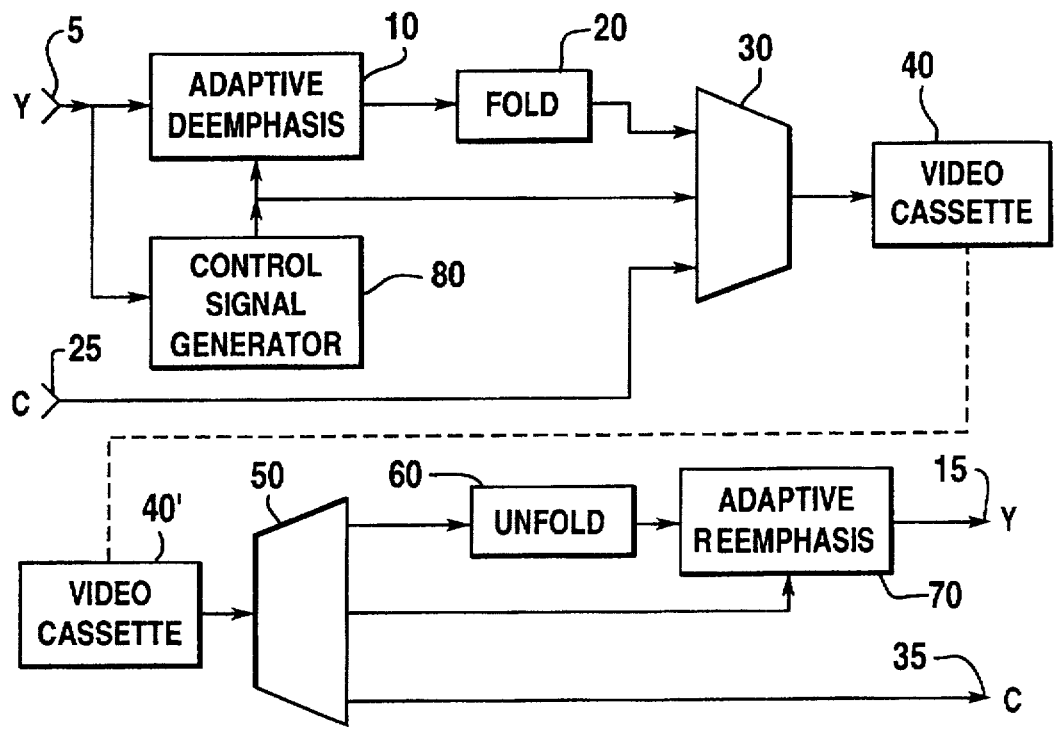
FIG. 1 is a block diagram of a portion of a video signal recording/playback system in accordance with principles of the invention.

In the drawing and in the detailed description below, various embodiments constructed in accordance with principles of the present invention are directed to an NTSC video signal. One skilled in the art would understand to modify the embodiments in order to process a PAL video signal, a SECAM video signal or a video signal according to any other standard. Such embodiments could still be constructed in accordance with principles of the present invention.

FIG. 1 is a block diagram of a video signal recording/playback system in accordance with principles of the invention. In FIG. 1, a luminance signal input terminal 5 is supplied a full-bandwidth luminance signal $Y_r$ from a source (not shown), which might be the luminance output terminal of a luminance-chrominance separator in the video signal recording/playback system or might be the luminance output terminal of a video camera, by way of specific examples. The luminance signal input terminal 5 is coupled to a signal input terminal of an adaptive deemphasis circuit 10 and an input terminal of a control signal generator 80. An output terminal of the adaptive deemphasis circuit 10 is coupled to an input terminal of a folding circuit 20. An output terminal of folding circuit 20 is coupled to a luminance signal input terminal of a combining circuit 30. An output terminal of combining circuit 30 is coupled to a mechanism for recording the combined signal on a recording medium, such as the magnetic recording tape in a video cassette. The recording mechanism and the medium are made up of well-known elements and provide an information transmission channel represented in FIG. 1 by a block 40 at top left, labelled VIDEO CASSETTE.

A control signal output terminal of control signal generator 80 is coupled to a control signal input terminal of the adaptive deemphasis circuit 10 and to a control signal input terminal of the combining circuit 30. A chrominance signal input terminal 25 is supplied a chrominance signal $C_r$ from a source (not shown), which might be the chrominance output terminal of the luminance-chrominance separator in the video signal recording/playback system or might be the chrominance output terminal of the video camera, by way of specific examples. Chrominance signal input terminal 25 is coupled to a chrominance signal input terminal of combining circuit 30.

A block 40' labelled VIDEO CASSETTE at the bottom right of FIG. 1 represents the known elements making up the playback mechanism for retrieving the previously recorded signal from the recording medium, which signal after its retrieval is supplied to an input terminal of a signal separator 50. A luminance signal output terminal of signal separator 50 is coupled to an input terminal of an unfolding circuit 60. An output terminal of unfolding circuit 60 is coupled to a signal input terminal of an adaptive reemphasis circuit 70. An output terminal of adaptive reemphasis circuit 70 is coupled to luminance signal output terminal 15. Luminance signal output terminal 15 is coupled to a utilization means (not shown) for the reconstructed full-bandwidth playback luminance signal $Y_p$ from the adaptive reemphasis circuit 70. The utilization means may be a luminance-chrominance signal combiner for generating a composite video signal or may be the luminance signal input terminal of a television monitor, by way of specific examples.

A control signal output terminal of separating circuit 50 is coupled to a control input terminal of the adaptive reemphasis circuit 70, and a chrominance signal output terminal of separating circuit 50 is coupled to a chrominance signal output terminal 35. Chrominance signal output terminal 35 is coupled to a utilization circuit for the playback chrominance signal $C_p$. By way of specific examples, the utilization circuit may be the luminance-chrominance signal combiner for generating a composite video signal, or it may be the chrominance signal input terminal of the television monitor.

It will be understood by one skilled in the art of video signal recording/playback systems that elements other than those illustrated in FIG. 1 must be present in a recording/playback system. One skilled in the art will understand where these elements should be placed and how they should be interconnected. For clarity, these elements have been omitted from FIG. 1, and will not be discussed in particular detail below.

In operation, the control signal generator 80 produces a control signal G which represents the level of the high-frequency portion of the full-bandwidth luminance signal. The control signal G is coupled to the control signal input terminal of the adaptive deemphasis circuit 10. The adaptive deemphasis circuit 10 operates to variably decrease the level of the high-frequency portion of the full-bandwidth video signal in response to the control signal from the control signal generator 80. The adaptive deemphasis circuit 10 and control signal generator 80 are discussed in detail below.

The high-frequency portion of the deemphasized luminance signal from the adaptive deemphasis circuit 10 is then folded into the low-frequency portion of the deemphasized luminance signal in folding circuit 20. U.S. Pat. No. 5,113,262 describes an exemplary folding circuit which may be used as the folding circuit 20 in FIG. 1. Other folding circuits which may be used as the folding circuit 20 in FIG. 1 are described in U.S. patent application Ser. No. 07/819,890 filed 13 Jan. 1992 by Christopher H. Strolle et alii, entitled DIGITAL MODULATORS FOR USE WITH SUB-NYQUIST SAMPLING OF RASTER-SCANNED SAMPLES OF IMAGE INTENSITY, and assigned to Samsung Electronics Co., Ltd.

The folded deemphasized luminance signal from folding circuit 20, the chrominance signal from chrominance signal input terminal 25 and the control signal from the control signal generator 80 are combined in combining circuit 30. One example of apparatus which may be used to combine the chrominance signal with the control signal for subsequent recording on the video cassette 40 is described further on in this application, with reference to FIG. 5 of the drawing. The combined control signal and chrominance signal is recorded in a spectral region below the spectral region in which the folded deemphasized luminance signal is recorded.

Figure 9:
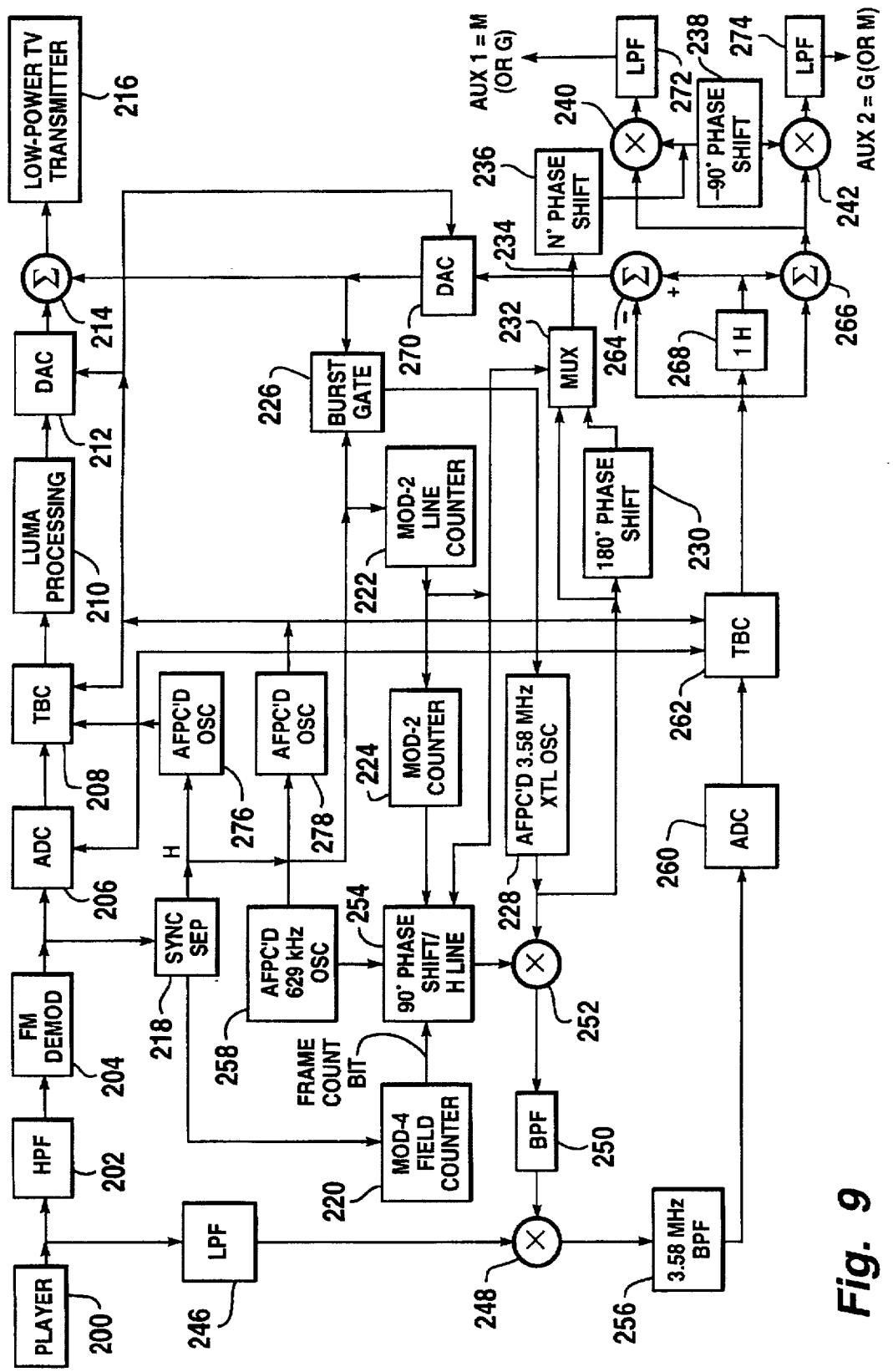
FIG. 9 is a block diagram showing the system for decoding or playing back the under signal encoding an augmented chroma signal.

Upon playback, the signal from video cassette 40' is processed by a separating circuit 50, which may be of the general type described further on in this application, with reference to FIG. 9 of the drawing. In such a separating circuit 50, the combined chrominance signal and control signal are first separated from the folded deemphasized luminance signal. Then the chrominance signal is separated from the control signal. The played-back folded luminance signal is supplied to the unfolding circuit; the separated chrominance signal is supplied to the chrominance signal output terminal 35, and the control signal is supplied to the control input terminal of the adaptive reemphasis circuit 70.

Unfolding circuit 60 unfolds the deemphasized high-frequency portion of the luminance signal from the low-frequency portion, and regenerates the deemphasized full-bandwidth luminance signal. This unfolded deemphasized full-bandwidth luminance signal is supplied to the signal input terminal of the adaptive reemphasis circuit 70. The adaptive reemphasis circuit 70 variably boosts the high-frequency portion of the luminance signal in response to the control signal. The output of the adaptive reemphasis circuit 70 is a full-bandwidth luminance signal in which the high-frequency portion has been restored to the correct level.

Figure 2:
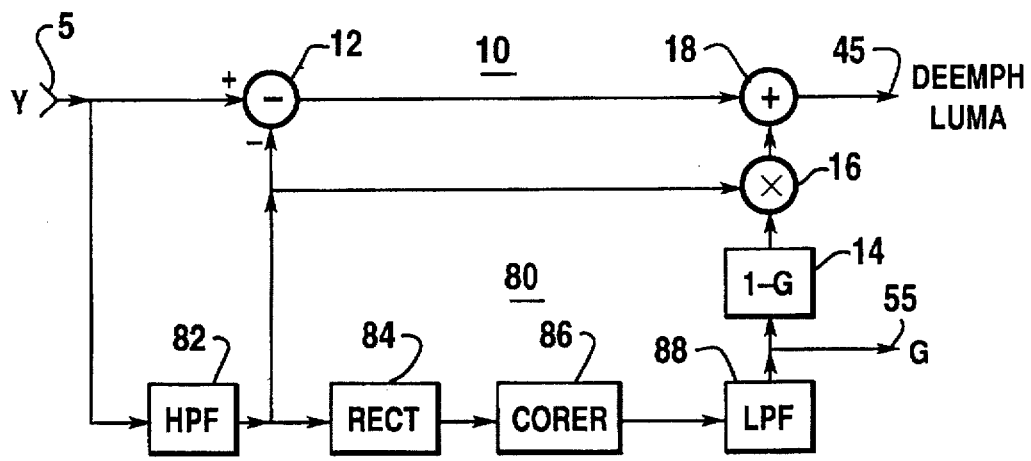
FIG. 2 is a block diagram of an adaptive deemphasis circuit and control signal generator which may be used in the video signal recording/playback system illustrated in FIG. 1.

FIG. 2 is a block diagram of an adaptive deemphasis circuit 10 and control signal generator 80 which may be used in the video signal recording/playback system illustrated in FIG. 1. In FIG. 2, input terminal 5 corresponds to input terminal 5 of FIG. 1. Input terminal 5 is coupled to an input terminal of a highpass filter (HPF) 82 and to a minuend input terminal of a subtractor 12. An output terminal of the subtractor 12 is coupled to an input terminal of an adder 18. An output terminal of the adder 18 is coupled to an output terminal 45. Output terminal 45 is coupled to the input terminal of folding circuit 20 (of FIG. 1).

An output terminal of HPF 82 is coupled to a subtrahend input terminal of subtractor 12, to a first input terminal of a multiplier 16, and to an input terminal of an absolute-value circuit, or rectifier, 84. An output terminal of the rectifier 84 is coupled to an input terminal of a corer 86. An output terminal of the corer 86 is coupled to an input terminal of a lowpass filter (LPF) 88. An output terminal of the LPF 88 produces a control signal G, and is coupled to an output terminal 55 and to an input terminal of a 1–G function circuit 14. Output terminal 55 is coupled to the control input terminal of the combining circuit 30 (of FIG. 1). An output terminal of the 1–G function circuit 14 is coupled to a second input terminal of the multiplier 16. An output terminal of the multiplier 16 is coupled to a second input terminal of the adder 18.

Figure 3:
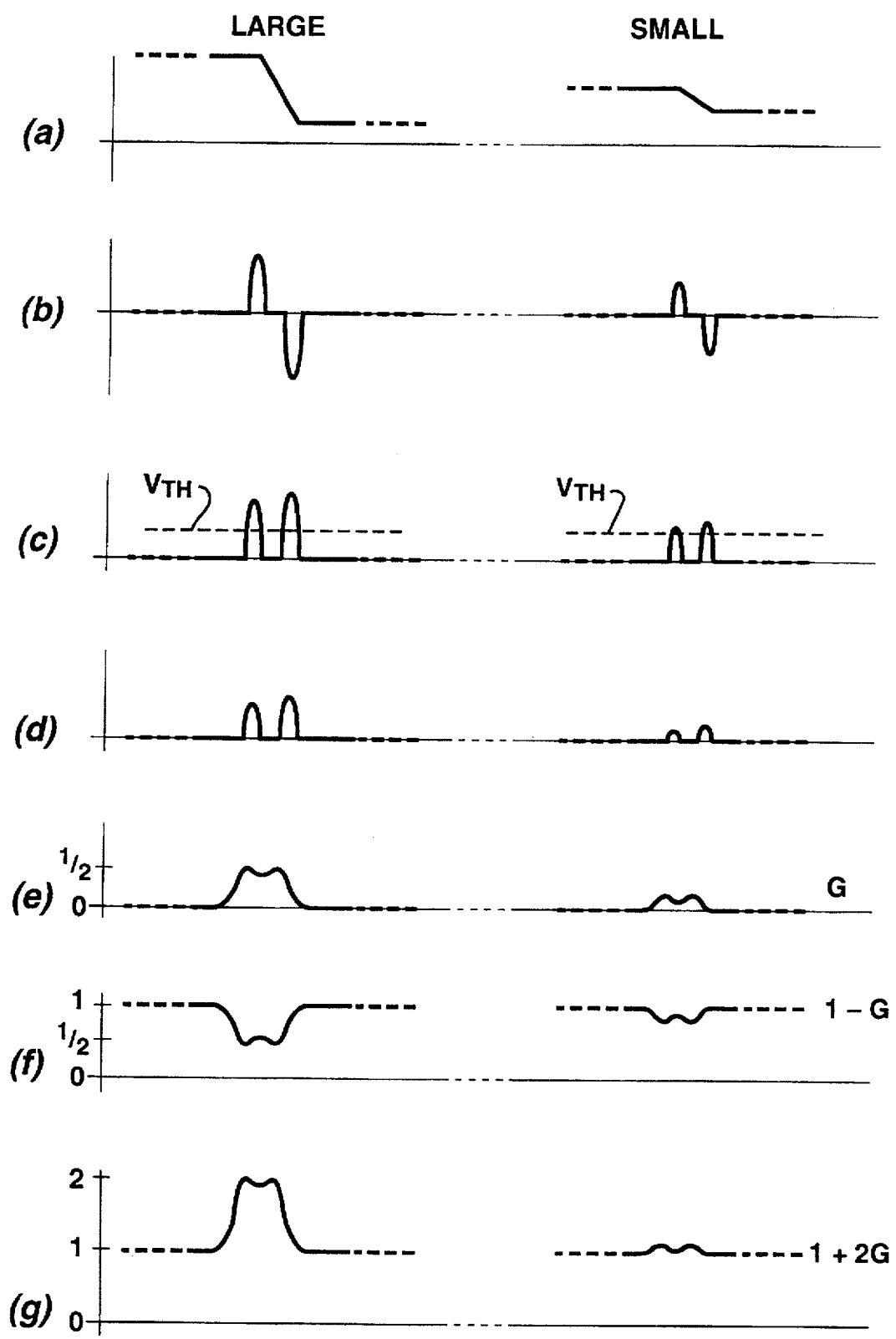
FIG. 3 is a set of related waveform diagrams a, b, c, d, e, f and g which are useful in understanding the operation of the adaptive deemphasis circuit illustrated in FIG. 2.

The operation of the adaptive deemphasis circuit 10 and the control signal generator 80 may be better understood by referring to the waveform diagrams illustrated in FIG. 3. In operation, the HPF 82 and subtractor 12 separate the high-frequency and low-frequency portions of the luminance signal $Y_r$ to be recorded. The output signal from HPF 82 contains the high-frequency portion of the luminance signal $Y_r$. The high-frequency portion of the luminance signal is subtracted from the full-bandwidth luminance signal in subtractor 12, leaving only the low-frequency portion in the resulting difference signal supplied to adder 18 for combination with an attenuated high-frequency portion to form the deemphasized luminance signal. The cut-off frequency of HPF 82, which determines the cross-over frequency between the high-frequency and low-frequency portions of the luminance signal $Y_r$, is chosen so that the high-frequency portion of the luminance signal $Y_r$ separated by the HPF 82 contains luminance information representing vertical edges.

FIG. 3a illustrates two examples of vertical edges. On the left hand side, a large amplitude vertical edge is illustrated and on the right hand side, a small vertical edge is illustrated. FIG. 3b illustrates the signal at the output terminal of the HPF 82. This signal is rectified by rectifier 84, and FIG. 3c illustrates the signal at the output terminal of rectifier 84, which represents the absolute value of the HPF 82 response.

The corer 86 operates to eliminate the effect of low-amplitude edges on the deemphasis function. The corer 86 operates as a threshold circuit. The threshold value is set to be above the average level of high-frequency noise that may be expected to accompany the luminance signal Y being prepared for recording, so the deemphasis circuitry does not respond to the high-frequency noise to reduce low-level luma detail. If the value of the input signal is greater than the threshold value, then the value of the output signal is the value of the input signal less the threshold value. FIG. 3d illustrates the signal at the output terminal of corer 86. Referring to FIG. 3c, the dotted line illustrates the threshold value. In FIG. 3d, only the portion of rectified signal illustrated in FIG. 3c which exceeds the threshold value passes through the corer circuit 86, producing the signal illustrated in FIG. 3d.

This type of coring is well known in analog circuitry and differs from the type of coring often encountered in digital processing in which, when generating the cored signal, input signal samples below a threshold value are replaced by zeroes and samples not below the threshold value are reproduced without change. When the corer 86 is to be of a type suitable for inclusion in digital circuitry, it can be realized using a digital subtractor and a multiplexer. The digital subtractor is connected for subtracting the threshold value from the rectifier 84 output signal. The mutiplexer is controlled by the sign bit from the digital subtractor, generating the cored signal by selecting positive values of the difference output signal from the digital subtractor for inclusion in the cored signal and selecting zeroes for inclusion in the cored signal rather than negative values of the difference output signal from the digital subtractor.

The output signal from corer 86 is passed through the LPF 88 to produce control signal G illustrated in FIG. 3e. The LPF 88 operates to spread the control signal G so that it changes gradually in the vicinity of the vertical edge. This signal is the control signal G which is supplied to the control signal input terminal of the combining circuit 30 (of FIG. 1). Control signal G is then recorded on the video tape of cassette 40 and used to control the reemphasis of the luminance signal in the adaptive reemphasis circuit 70 (of FIG. 1).

The control signal G scaled to vary between zero, when the level of the high-frequency portion of the luminance signal is small, and one-half, when the level of the high-frequency portion is large. The control signal G is then subtracted from unity value in the 1−G function circuit 14, producing the (1−G) signal illustrated in FIG. 3f. The 1−G function circuit 14 may be constructed in known manner of analog or digital arithmetic elements, or in a look-up table in a particular digital implementation. This (1−G) signal varies between unity, or one, when the level of the high-frequency portion of the luminance signal is small, and one-half, when the level of the high-frequency portion is large. This signal is supplied to one input terminal of the multiplier 16. The multiplier 16 scales the level of the high-frequency portion of the luminance signal respective to the level of its low-frequency portion, doing this by multiplying the high-frequency portion of the luminance signal and the (1−G) signal together. This scaled high-frequency portion is then added to the low-frequency portion of the luminance signal to form the deemphasized luminance signal supplied for recording.

When the level of the high-frequency luma is high, the scaling factor is one-half and the level of the high-frequency luma is halved for recording. When the level of the high-frequency luma is low, the sealing factor is nearly unity, or one, and the level of the high-frequency luma is left unchanged for recording. At intermediate levels of the high-frequency luma, the scaling factor is intermediate between one-half and one; and the level of the high-frequency luma in the deemphasized luminance signal supplied for recording is at a corresponding intermediate value.

Figure 4:
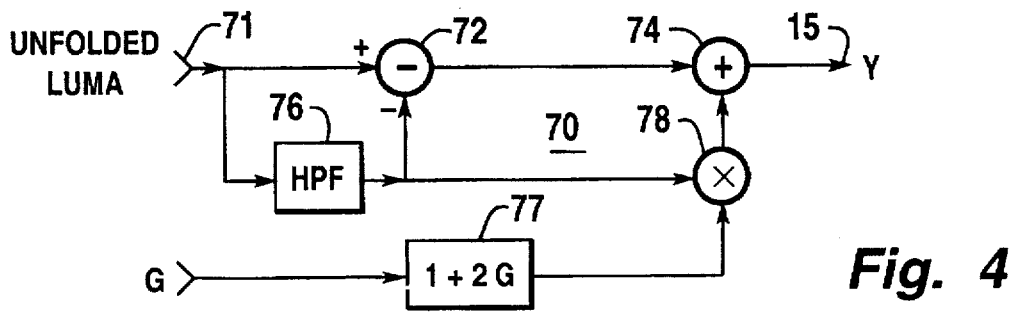
FIG. 4 is a block diagram of an adaptive reemphasis circuit which may be used in conjunction with the deemphasis circuit illustrated in FIG. 2.

FIG. 4 is a block diagram of the adaptive reemphasis circuit 70 illustrated in FIG. 1. In FIG. 4, an input terminal 71 is coupled to the output terminal of the unfolding circuit 60 (of FIG. 1). Input terminal 71 is coupled to a minuend input terminal of a subtractor 72 and to an input terminal of a highpass filter (HPF) 76. An output terminal of the subtractor 72 is coupled to a first input terminal of an adder 74. An output terminal of the adder 74 is coupled to output terminal 15, which corresponds to the output terminal 15 of FIG. 1.

An output terminal of the HPF 76 is coupled to a subtrahend input terminal of subtractor 72 and to a first input terminal of a multiplier 78. An input terminal 75 is coupled to the control signal output terminal of the separator 50 (of FIG. 1) to receive the control signal $G_p$ retrieved during playback. The input terminal 75 is coupled to an input terminal of a 1+2G function circuit 77. An output terminal of the 1+2G function circuit 77 is coupled to a second input terminal of the multiplier 78.

In operation, the HPF 76 and subtractor 72 separate the high-frequency portion of the reproduced unfolded deemphasized luminance signal from the low-frequency portion. The output of the HPF 76 is the high-frequency portion, which, when subtracted from the full-bandwidth unfolded deemphasized luminance signal in the subtractor 72, leaves only the low-frequency portion.

Control signal G, previously recorded on the video tape and now recovered during playback, is multiplied by two and the resulting product added to unity, or one, in the 1+2G function circuit 77. Function circuit 77 may be constructed inknown manner of analog or digital arithmetic elements, or a look-up table in one particular type of digital implementation. Thus, if the value of the signal G is zero, then the value of the output signal from the 1+2G function circuit 77 is unity, or one; if the value of the signal G is one-quarter, then the value of the output signal from the 1+2G function circuit 77 is one-and-a-half; and, if the value of the signal G is one-half, then the value of the output signal from the 1+2G function circuit 77 is two.

FIG. 3g illustrates this control signal (1+2G). This signal (1+2G) is used to scale the high-frequency portion of the reproduced deemphasized luminance signal from the high-pass filter 76. The high-frequency portion of the deemphasized luminance signal is scaled by the multiplier 78. When the original control signal G had a value zero indicative of the level of the high-frequency luma having been small, then the high-frequency luma supplied for recording was scaled by the (1−G) signal, which had a value unity, or one. Thus, the high-frequency luma was not deemphasized as supplied for recording. Upon playback, the played back high-frequency luma is scaled up respective to low-frequency luma by the (1+2G) signal, which also has a value of unity, or one. Thus, the high-frequency luma is not emphasized respective to the low-frequency luma. In this case, the level of high-frequency luma is not changed relative to the level of low-frequency luma in the luminance signal supplied for recording or in the luminance signal reproduced during playback.

When the original control signal G had a value of one-half, indicative of the level of the high-frequency luma supplied for recording having been large, then the amplitude of the high-frequency luma vis-a-vis the amplitude of the low-frequency luma was scaled down by the (1−G) signal, which also had a value one-half. Upon playback, the high-frequency luma is scaled up vis-a-vis the amplitude of the low-frequency luma by the (1+2G) signal, which has the value two. Thus, the high-frequency luma, which was halved in amplitude vis-a-vis the amplitude of the low-frequency luma in the luminance signal supplied for recording, is subsequently doubled in amplitude vis-a-vis the amplitude of the low-frequency luma in the luminance signal reproduced during playback. In this case, too, the level of high-frequency luma is not changed relative to the level of low-frequency luma in the luminance signal supplied for recording or in the luminance signal reproduced during playback.

The product of (1−G) and (1+2G) is unity, or one, for each of these boundary conditions. For other conditions, between these boundary conditions, there is some peaking of luma high frequencies during reemphasis, but not enough to be objectionable. The largest amount of luma-high-frequency peaking occurs for the value of the signal G being one-quarter, where the product of (1−G) and (1+2G) is 9/8. Presuming the 1+2G function circuit 77 to be a simple shift-and-add circuit, some adjustment of the unity-valued summand to be 15/16 will reduce luma-high-frequency overpeaking when the original control signal G had a value of one-quarter, while underpeaking luma when the original control signal G had a value near zero or near one-half. Other adjustments of the function circuits 14 and 77 are possible to reduce absolute peaking errors, when these circuits are constructed from arithmetic elements. When one or both of the function circuits 14 and 77 is a read-only memory storing a look-up table, the look-up-table entries can be chosen to eliminate luma-high-frequency peaking errors no matter what value the original control signal G is.

The reemphasized high-frequency portion of luma from the multiplier 78 is recombined with the low-frequency portion of luma from subtractor 72 in adder 74. The output from adder 74 is the full-bandwidth luminance signal. However, because the high-frequency portion of the luminance signal was attenuated before it was folded into the low-frequency portion in folding circuit 20 of FIG. 1, if the thus recorded video cassette is subsequently played back on a VCR which does not have the unfolding circuit, the artifacts caused by the presence of the high-frequency portion will not be objectionable. Such a cassette is backward-compatible.

The video signal recording/playback system of the invention has thusfar been described in general terms. The system may be implemented in analog form, either in continuous or sampled data form, or may be implemented in digital form. One skilled in the art and acquainted with the foregoing description will understand how to implement this system in many forms. A particular form lending itself well to digital implementation is described following.

Figure 5:
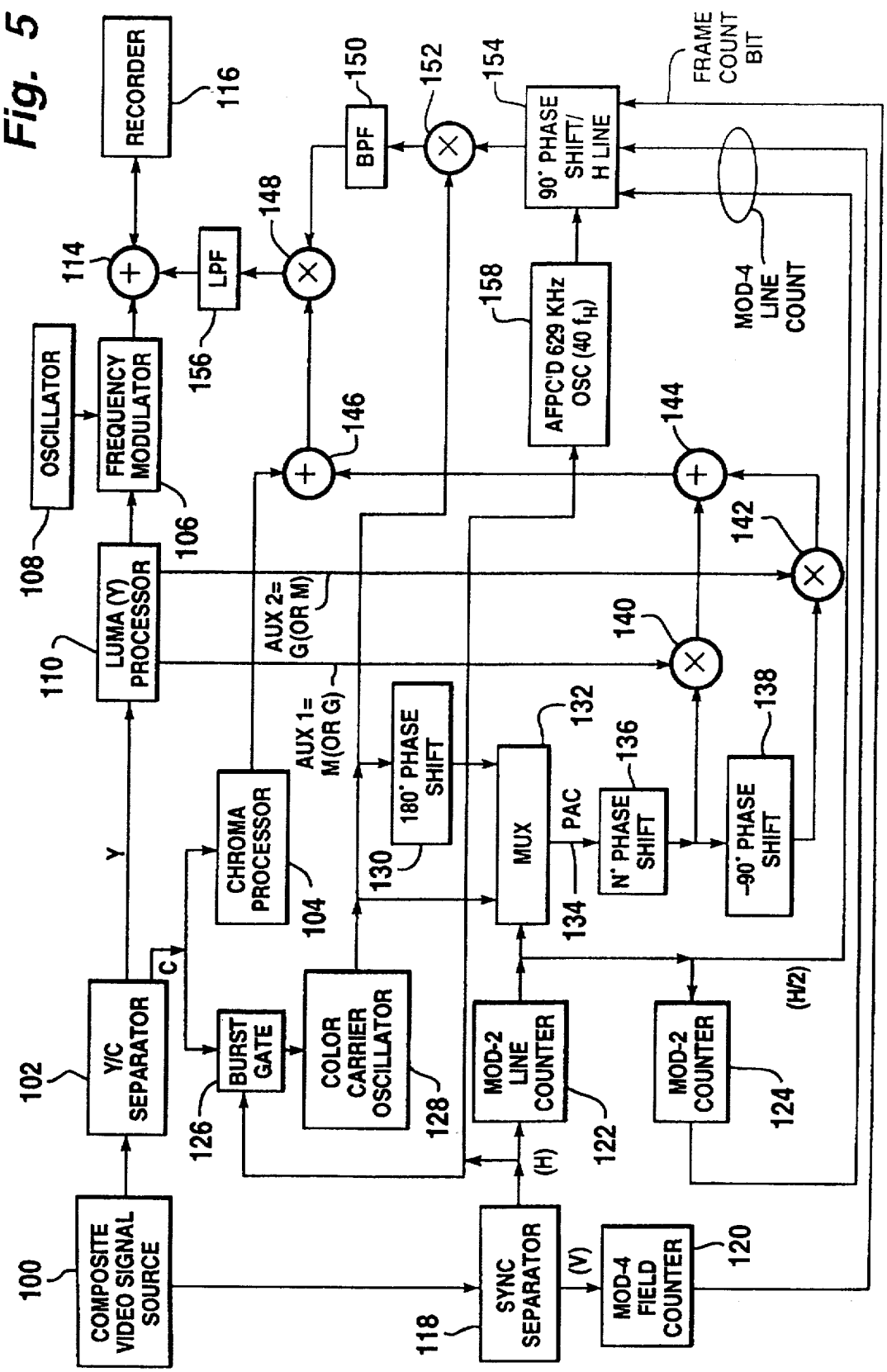
FIG. 5 is a block diagram of the record section of a video recorder similar to that shown in U.S. Pat. No. 5,113,262, but using a different second under signal for conveying signals respectively indicative of frame-to-frame motion and of the de-emphasis of folded luma highs, in addition to a first under signal that corresponds to the color-under signal used in VHS recording.

FIG. 5 shows more particularly how, the luminance signal $Y_r$ and chrominance signal $C_r$ are obtained for purposes of recording and the nature of the combining circuitry 30 shown in FIG. 1. FIG. 5 shows a source 100 supplying a composite video signal in NTSC format to a luma/chroma (Y/C) separator 102 providing the separated luma signal $Y_r$ and chroma signal $C_r$. The Y/C separator 102 is preferably of the type employing one-H combing of the chroma signal. The separated chroma signal $C_r$ is supplied to a chroma processor 104. The chroma processor 104, which is explained in more detail in U.S. Pat. No. 5,113,262, removes components of the separated chroma signal $C_r$ likely to cause crosstalk problems.

A frequency modulator 106, of a conventional form used in the video recording art, modulates the frequency of a luminance carrier wave supplied from an oscillator 108. The frequency modulation is in accordance with output signal from a luma processor 110 that generates an analog folded-spectrum luminance signal of reduced bandwidth, no wider than that found in conventional VHS recording, proceeding from the separated luma signal $Y_r$ supplied by the Y/C separator 102. U.S. Pat. No. 5,113,262 describes how this is done. The luma processor 110 also contains circuitry for generating the control signal G, however, as previously described with reference to FIG. 2. The resulting FM signal encoding luma is supplied to an adder 114 there to have an augmented color-under signal combined therewith to generate the processed video signal supplied to a video casette recorder 116 for recording.

The Y/C separator 102 also supplies the separated luma signal $Y_r$ to a sync separator 118. The sync separator 118 supplies separated vertical synchronizing pulses (V) to a two-stage binary counter 120 that counts fields of video on a modulo-four basis and supplies frame count as one of its two bits of count. A way for resetting the counter 120 so that it generates frame count properly is described in U.S. patent application Ser. No. 07/819,890.

The sync separator 118 supplies separated horizontal synchronizing pulses (H) to a binary counter stage 122 that counts lines of video on a modulo-two basis, thereby functioning as a pulse rate divider for separated horizontal synchronizing pulses. The modulo-two line count from the counter stage 122 is supplied to a further modulo-two counter stage 124, the counter stages 122 and 124 together forming a two-stage binary counter that generates a modulo-four line count and that is reset during each vertical retrace interval by an edge of one of the separated vertical synchronizing pulses from the sync separator 118.

The sync separator 118 also supplies separated horizontal synchronizing pulses (H) to a burst gate 126. The burst gate 126 gates the color burst portions of the separated chroma signal $C_r$ (each of which occurs a prescribed interval after a corresponding horizontal synchronizing pulse) to a 3.58 MHz color subcarrier oscillator 128, to be used in the automatic frequency and phase control (AFPC) of the oscillator 128. The color subcarrier oscillator 128 generates a 3.58 MHz continuous-wave (CW) carrier, which is frequency- and phase-locked in quadrature with the color burst signal, or a sampled-data digital description of such a signal. A 180° phase shift circuit 130 responds to the output signal of the oscillator 128 to generate the complement of that output signal.

The modulo-two line counter 122 generates an output signal for controlling a MUX 132, which signal is a logic ONE on odd horizontal scan lines and is a logic ZERO on even horizontal scan lines, as ones of those scan lines consecutive in time are consecutively counted. The MUX 132 responds to select alternately the color subcarrier at 90° and 270° as respectively provided by the oscillator 128 and the 180° phase shift circuit 130, thereby to provide a phase-alternating carrier (PAC) to a bus 134.

A phase-shifter 136 phase shifts the PAC by N degrees relative to the phase of the PAC on the line 134, N being an arbitrarily prescribed number. In embodiments of the FIG. 5 circuitry in which the oscillator 128, the multiplexer 132 and the 180° phase shift circuit 130 are digital circuitry, the phase-shifter 136 may be provided by read-only memory (ROM) programmed to hold a look-up table (LUT) of phase-shifted output addressed by the digital output signal on the bus 134. Supposing the color subcarrier oscillator 128 is implemented in the digital regime and generates a sampled-data digital description of a continuous 3.58 MHz carrier wave in two's complement form, the 180° phase shifter 130 and the multiplexer 132 can be replaced by a digital adder/subtractor operated as a selective complementor, selectively adding the digitized 3.58 MHz carrier wave to arithmetic zero or subtracting it from arithmetic zero, and applying the results to the bus 134. Alternatively a read-only memory (ROM) can be used that is addressed by the digital output of the oscillator 128, as extended one bit to include the output state of the modulo-two line counter 122, to provide the LUT function of the smaller ROM just described, while dispensing with the multiplexer 132 and the 180° phase shifter 130.

The PAC supplied from the phase shifter 136 is further phase shifted by −90° (i.e. advanced 90° in phase) by a phase shifter 138, which in digital implementations can be provided by a further LUT held in another ROM. Alternatively, in digital implementations, responsive to the addresses supplied on bus 134, the two phases of PAC that are in quadrature phase relationship with each other may be supplied in parallel from a pair of LUTs stored side-by-side in the same ROM.

A motion signal M and the control signal G descriptive of the adaptive emphasis of luma highs are supplied from the luma processor 110, which signals are preferably lowpass one-H combed. A modulator 140 modulates the PAC supplied from the phase shifter 136 in accordance with a first auxiliary signal AUX1 that is one of the signals M and G. A modulator 140 modulates the PAC supplied from the phase shifter 138 in accordance with a second auxiliary signal AUX2 that is the other of the signals M and G. In each case the nature of the modulation is balanced amplitude modulation, so an orthogonal pair of quadrature amplitude modulation (QAM) sidebands are generated by the modulators 140 and 142, which QAM sidebands are combined in an adder 144 to generate a PAC with complex amplitude modulation.

The PAC with complex amplitude modulation is supplied from the adder 144 to a further adder 146, there to be added to the processed chroma signal (C') supplied from the chroma processor 104. The output of adder 146 is the augmented chroma signal comprised of the chroma signal, encoded with chroma information (in two quadrature phases in NTSC), and the PAC with complex amplitude modulation by the M and G signals. The magnetic tapes used in the industry presently are bandwidth limited and accordingly dictate that the augmented chroma signal be down-converted so as to place it into the so-called color-under format. Accordingly, the augmented chroma signal from the adder 146 is remodulated to the spectrum below the luma channel. Typically, the color-under carrier is at 629 KHz ($=40f_h$) in the VHS system.

The means to generate the signals in color-under format will now be described. The augmented chroma signal from the adder 146 is supplied to a first input of a modulator 148. The second input to the modulator 148 is a 4.21 MHz carrier signal supplied via a bandpass filter (BPF) 150 from the output of another modulator 152. The modulator 152 has two inputs: a 90° phase CW color subcarrier from the oscillator 128, and a 629 KHz ($=40f_h$) carrier supplied from the output of a 90°-phase-shift-per-horizontal-scan-line shifter 154. The modulator 152 accordingly generates 2.95 MHz and 4.21 MHz sidebands. The BPF filter 150 passes only the 4.21 MHz sidebands to the modulator 148.

The modulation products of the modulator 148 have the chroma signal and the M and G signals modulated on sidebands 3.58 MHz above and below the 4.21 MHz carrier supplied via the BPF 150. A lowpass filter (LPF) 156 passes only the lower-frequency, 629 KHz sidebands, which are collectively referred to in this specification and the claims which follow it as the composite color-under signals. These 629 KHz sidebands have to be in analog form for application to the analog adder 114 to be combined with the analog frequency-modulated luminance carrier supplied from the frequency modulator 106. A digital to analog converter (not shown) converts the composite color-under signals from the LPF 156 to analog form when the chroma processing is carried out digitally. In such digital chroma processing the modulators 140, 142, 148 and 152 are four-quadrant digital multipliers; adders 144 and 146 are digital adders; and filters 150 and 156 are digital filters. One acquainted with digital design will understand that there is compensating digital delay in various connections to compensate for latent delays in the digital elements 140, 142, 144, 146, 148, 150, 152 and 156.

The phase shifter 154 receives digital descriptions of the 629 KHz sinusoidal CW carrier from an oscillator 158, which oscillator has automatic frequency and phase control (AFPC) for locking to the horizontal sync pulses (H) separated from the digital composite video signal by the sync separator 118. The modulo-four line count from the counter stages 122 is used together with the modulo-four field count from the field counter 120 to select which of 0°-, 90°-, 180°- and 270°- phase responses to the 629 KHz from the oscillator 158 is applied to the modulator 152 during successive scan lines. This is a procedure similar to that used in prior-art VHS video cassette recorders.

Those skilled in this art will appreciate that the processing of the phase-alternating carrier (PAC) to be modulated with the M and G auxiliary signals is analogous to the modulation of 33° and 123° phases of a color subcarrier with I and Q chroma components respectively to generate the chroma signal. Thus the modulated auxiliary signals of the present invention are in quadrature with each other, analogous to the I and Q signals of the conventional chroma signal which also are in quadrature with each other.

Figures 6, 7:
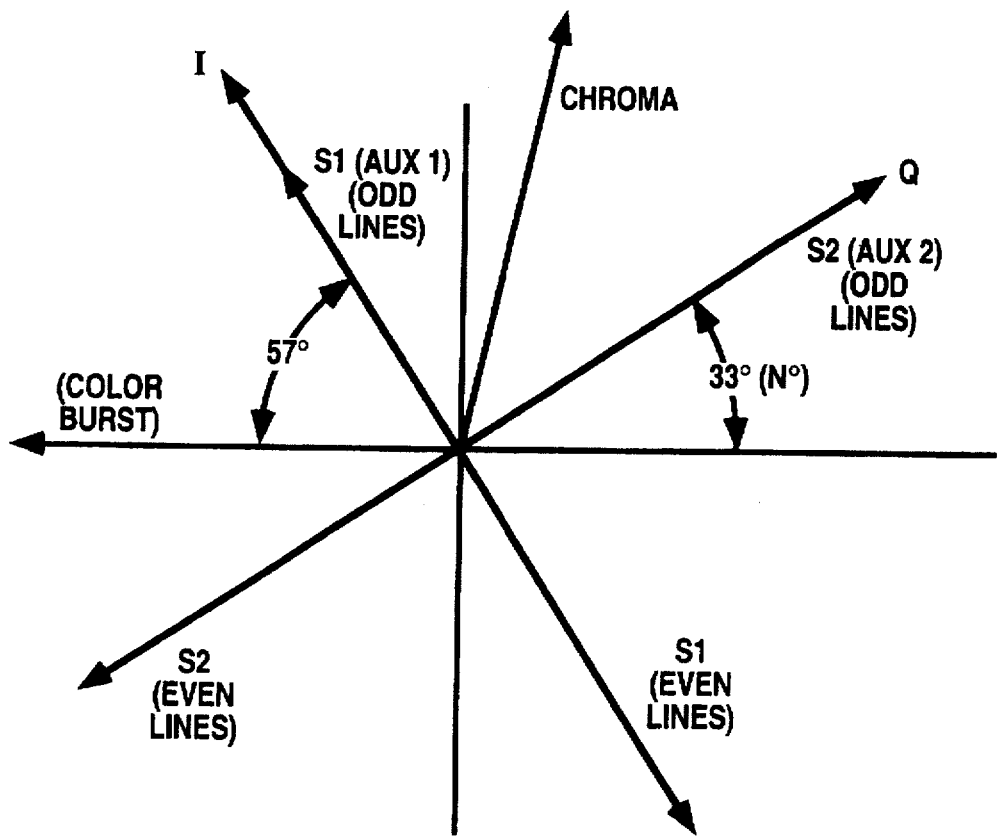

The operation of the system of FIG. 5 will be further explained in conjunction with the vector diagrams of FIG. 6 showing possible relative positions of the I and Q vectors and of the vectors of the auxiliary signals AUX1 and AUX2. The number N of degrees provided by the phase shifter 132 is selected such that the phase angles of the signals AUX1 and AUX2 respectively supplied from the modulators 140 and 142, as correspond to respective ones of the M and G vectors, are the same as the phase angles of the I and Q signals, respectively. As mentioned above, N can be any desired value. The diagram would have to be more complex to illustrate the other possible values of N; providing such a diagram is not considered necessary for an understanding of the operation of the system by one skilled in this art.

FIG. 6 shows that the position of the I and Q vectors remain constant relative to the chroma burst vector, which nevertheless it should be understood that the chroma burst vector exhibits staggered spatial phasing from line to line. However, because the PACs carrying the auxiliary signals AUX1 and AUX2 alternate phasing line-to-line respective to the color subcarrier, the auxiliary signals AUX1 and AUX2 are in-phase with the I and Q signal on odd lines, and out-of-phase on even lines, as shown in FIG. 6.

FIG. 7 of the drawing is a Table I tabulating the temporal phase values of the NTSC color subcarrier and of the phase-alternating carrier of like frequency disclosed in this specification. In conventional operation, according to the specifications of the NTSC, the 3.58 MHz color subcarrier is not phase-alternating, which is to say its temporal phase is continuous from line to line. However, the 3.58 MHz color subcarrier has an odd number of half cycles per scan line, causing it to start with an additional 180° offset on each successive line being scanned. This offset is sometimes thought of as staggered spatial phasing of chroma from line to line. At the start of the first and second field on lines 1 and 263 respectively of video frame one, the temporal phase of the color subcarrier is at 0°. At the start of the first and second field of frame two, however, the temporal phase of the color subcarrier is at −180°. The temporal phase of the PAC, moreover, it should be understood, is at 0° at the start of each field of frames 1 and 2. There is no staggered spatial phasing of PAC information from line to line.

FIG. 8 of the drawing is a Table II that tabulates the temporal phases not only of the 3.58 MHz color subcarrier and of the 3.58 MHz phase-alternating carrier (PAC), but also the temporal phases of those signals as respectively remodulated to 629 kHz as well. An analysis of the phase progression of the color-under chroma carrier at 629 KHz depends on an understanding of the VHS standards which specify the phase angle of 629 KHz carrier to be incrementally retarded by 90° per horizontal scan line for field 1, and then reversing the process, to be incrementally advanced by 90° per horizontal scan line for field 2. As indicated in Table II, the PAC color-under carrier is in-phase with the chroma color-under carrier on odd lines, and 180° out-of-phase on the even lines for the frame 1. This is due-to the constrained alternation of the PAC carrier phase as described above. Table II indicates that on any two given adjacent lines in a frame, the two 629 KHz carriers are always 180° out-of-phase on one line, and in-phase on the other line. The relative position of the I and Q vectors and the auxiliary signal vectors AUX1 and AUX2 remains the same for the color-under mode as shown in FIG. 6. It should be understood that Table II refers to the carriers without modulation.

In practice, from the standpoint of simplest and cheapest recording and playback electronics, it is preferable that the phase shifter 132 be replaced by direct connection, which rotates the PAC vectors so they fall on the in-phase and quadrature-phase axes. Since the color subcarrier oscillator 116 is frequency- and phase-locked in quadrature with the color burst signal at 180° phasing, the oscillator 116 generates a 3.58 MHz continuous wave carrier at 90° phasing. When the phase shifter 136 is replaced by direct connection, the modulator 140 receives the 3.58 MHz continuous wave carrier at 90° phasing during a first set of alternate scan lines and receives the 3.58 MHz continuous wave carrier at 270° phasing during a second set of alternate scan lines time-interleaved with the first set. When the phase shifter 136 is replaced by direct connection, the phase shifter 138 supplies the modulator 142 with 3.58 MHz continuous wave carrier at 0° phasing during the first set of alternate scan lines and with 3.58 MHz continuous wave carrier at 180° phasing during the second set of alternate scan lines.

FIG. 9 shows a block diagram of the decoder or playback system as may be used to implement the invention. The FM luminance carrier and the 629 KHz carriers modulated with the chroma and the M and G auxiliary signals are supplied as a playback signal from a video tape player 200.

A highpass filter 202 separates the FM luma signal from the playback signal for application to an FM detector 204, usually of a pulse-counting type. The FM detector 204 supplies folded-luminance signal to an analog-to-digital converter 206 for digitization. The digitized folded-luminance signal is supplied to a time-base corrector 208, which supplies time-base corrected, digitized folded-luminance signal to luminance processing circuitry 210. The luminance processing circuitry 210 is generally of the type described U.S. Pat. No. 5,113,262, but more specifically considered, is modified in accordance with those aspects of the invention described above with reference to FIG. 4. The digital full-spectrum luminance signal from the luminance processing circuitry 210 is converted back to analog form by a digital-to-analog converter 212. The resulting analog full-spectrum luminance signal is supplied to an analog adder 214, there to be combined with chrominance signal to form a composite video signal. This composite video signal is supplied to a low-power TV transmitter 216 of a type suitable for furnishing low-power television signals to a TV receiver.

A sync separator 218 separates vertical synchronizing pulses in the folded-luminance signal supplied from the FM detector 204 to supply V signal to a modulo-two field counter 220 and separates vertical synchronizing pulses in that folded-luminance signal to supply an H signal to a modulo-two line counter 222. The modulo-two line count from the counter stage 222 is supplied to a further modulo-two counter stage 224 that together with the counter stage 222 generates a modulo-four line count.

A lowpass filter 246 separates the 629 KHz color-under sidebands and auxiliary-signal-under sidebands from the playback signal for application to a modulator 248, there to be heterodyned with a selectively phase-shifted 4.21 MHz carrier selected to the modulator 248 by a bandpass filter 250. The augmented color-under carrier is upconverted with a bandpass filter 256 selecting the resulting sidebands of 3.58 MHz suppressed carrier to an analog-to-digital converter 260 for digitization. The digitized augmented chrominance signal is supplied from the converter 260 to a time-base corrector 262.

Separated horizontal synchronizing pulses supplied by the sync separator 218 are used in the automatic frequency and phase control (AFPC) of an oscillator 258 supplying 629 KHz (=40 $f_h$) sinusoidal carrier to a phase shifter 254. The modulo-two field count from the field counter 220 is used together with the modulo-four line count supplied by the counter stages 222 and 224 to determine which of 0°-, 90°-, 180°- and 270°- phase responses to the 629 KHz from the oscillator 258 is applied to the modulator 252 during successive scan lines.

Since the phase shifter 254 also receives 629 KHz sinusoidal CW carrier from the oscillator 258, which is under control of the horizontal sync pulses (H) separated from the digital composite video signal by the sync separator 218, the selectively phase-shifted 629 KHz carrier supplied from the phase shifter 254 to the modulator 252 is accordingly line-locked to the folded-luminance signal. The modulator 252 heterodynes the selectively phase-shifted 629 KHz carrier with 3.58 MHz sinusoidal CW carrier from a color subcarrier oscillator 228 to generate selectively phase-shifted carriers at 2.95 MHz and 4.21 MHz. The bandpass filter 250 selects selectively phase-shifted 4.21 MHz carrier for application to the modulator 248.

The time-base corrected composite chrominance signal from the time-base corrector 262 is applied to the subtrahend (−) input of a subtractor 264, to one input of an adder 266, and to the input of a 1H delay line 268. The delayed response of 1H delay line 268 provides the minuend input of the subtractor 264 and a further input of the adder 266.

The subtractor 264 and the 1H delay line 268 combine to provide a bandpass line-comb filter that removes M and G auxiliary signal information from the chroma signal supplied as difference output signal from the subtractor 264. This separated chroma signal is supplied to a digital-to-analog converter 270. Converter 270 supplies analog separated chroma signal to the analog adder 214 to be combined with the analog full-spectrum luminance signal to regenerate composite video signal for application to the low-power TV transmitter 216. In video cassette players that are combined with a TV receiver in apparatus known as a "TV/VCR 'combo", the analog full-spectrum luminance signal from digital-to-analog converter 212 will be supplied directly to the color matrixing circuitry of the TV receiver; and the analog chrominance signal from digital-to-analog converter 270 will be supplied to suitable color demodulator circuitry to obtain color difference signals also to be supplied to the color matrixing circuitry of the TV receiver. Suitable color demodulation apparatus for a TV/VCR combo is described in U.S. Pat. No. 5,083,197 issued 21 Jan. 1992 to J. W. Ko and C. B. Patel and entitled APPARATUS FOR RESTORING THE CORRECT PHASE RELATION OF THE CHROMA AND LUMINANCE SIGNALS PASSED THROUGH SEPARATE PATHS.

The digital-to-analog converter 270 also supplies analog separated chroma signal to a burst gate 226. The burst gate 226 responds to horizontal synchronizing pulses separated by the sync separator 218, to selectively apply to the automatic frequency- and phase-control circuitry of the local color subcarrier oscillator 228 the color bursts occurring a short time after each such horizontal sync pulse. The 228 is a crystal-controlled oscillator, so its AFPC is primarily used for controlling the phase of the 3.58 MHz sinusoidal CW carrier it generates, for locking that phase in quadrature with the separated color burst supplied from the burst gate 226.

The 90° 3.58 MHz carrier from the oscillator 228 is supplied to a 180° phase shift circuit 230 to generate a 270° 3.58 MHz carrier. The modulo-two line counter 222 generates an output signal for controlling a multiplexer 232, which signal is a logic ONE on odd horizontal scan lines and is a logic ZERO on even horizontal scan lines, as ones of those scan lines consecutive in time are consecutively counted. The MUX 232 responds to select alternately the color subcarrier at 90° and 270° as respectively provided by the oscillator 228 and the 180° phase shift circuit 230, thereby to provide a phase-alternating carrier (PAC) to a bus 234. A phase-shifter 236 phase shifts the PAC by N degrees relative to the phase of the PAC on the line 234, N being an arbitrarily prescribed number determining the phase shift in degrees afforded by the phase-shifter 136 during recording. The PAC supplied from the phase shifter 236 is further phase shifted by −90° (i.e. advanced 90° in phase) by a phase shifter 238. The elements 230, 232, 234, 236 and 238 used for playback are similar to the elements 130, 132, 134, 136 and 138 used for recording, and the possible design variations are the same for both sets of elements.

The adder 266 and the 1H delay line 268 combine to provide a lowpass line-comb filter that removes chroma-related information from the M and G auxiliary signal information supplied as sum output signal from the adder 266. The complex amplitude modulation of the 3.58 MHz color subcarrier just by auxiliary signals, AUX1 and AUX2, is recovered at the output of adder 266. Modulators 240 and 242 synchronously detect the complex amplitude modulation sidebands comprising the adder 266 output signal in accordance with the PAC carriers respectively provided modulators 240 and 242 from the bus 234 and from the phase shifter 238. A lowpass filter 272 responds to the modulator 240 output signal, suppressing the image sidebands flanking the second harmonic of color subcarrier in its response, to regenerate the AUX1 signal supplied to the modulator 140 during recording. A lowpass filter 274 responds to the modulator 242 output signal, suppressing the image sidebands flanking the second harmonic of color subcarrier in its response, to regenerate the AUX2 signal supplied to the modulator 142 during recording. The one of the regenerated AUX1 and AUX2 signals that corresponds to G signal is then supplied to the 1+2G function circuit 77 shown in FIG. 4.

The modulo-four line count provided by the counter stages 222 and 224 is reset to prescribed value by an edge of each separated vertical synchronizing pulse supplied from the sync separator 218. So, synchronizing the frame count from the counter 220 with the frame count from the counter 120 will synchronize the phasing of the PAC signal generated for application to the bus 234 during playback with the PAC signal generated for application to the bus 134 during recording. However, in order for this to be done, information concerning the frame count from the counter 120 must be included in the signal recorded on the video tape and recovered during playback to synchronize the frame count from the counter 220. Since the M and G signals that are recorded are each always of one polarity, incorrect frame synchronization of the count supplied from the counter 220 will be evidenced within no more than a field time by reversals of each of the M and G signals from its proper polarity. This observation is used in one method for correcting the count stored in the counter 220, in which method the reversal of either of the M and G signals from its proper polarity is detected and used to initiate procedures that lower the count by one. Alternatively, information concerning the frame count from the counter 120 can be encoded in the vertical retrace interval of the signal recorded on the video tape, recovered from the signal played back from the video tape and then used to synchronize the counter 220.

The horizontal synchronizing pulses separated by the sync separator 218 are used in the automatic frequency and phase control (AFPC) of an oscillator 276 generating clocking signals for the analog-to-digital converters 206 and 260 and for the writing of digital memories respectively included in the time-base correctors 208 and 262. The oscillator 276 has a relatively short time constant AFPC, so as to generate "nervous" clocking signals that closely track any variations in the time-base of played back signals. The oscillator 276 generates oscillations of a frequency well above Nyquist rate for the full-spectrum luminance signal. This frequency is divided to obtain a feedback signal, which is compared in the oscillator 276 AFPC circuitry to the horizontal synchronizing pulses separated by the sync separator 218 in order to generate an error signal for locking the oscillator 276 oscillations to a high harmonic of line frequency. Rather than using the separate 629 KHz oscillator 258 shown in FIG. 9, a 629 KHz square wave can be taken from the frequency divider circuitry of the oscillator 276 for application to the modulator 252.

The horizontal synchronizing pulses separated by the sync separator 218 are also used in the automatic frequency and phase control (AFPC) of an oscillator 278 generating clocking signals for sample-and-hold circuits in the digital-to-analog converters 212 and 270 and for the reading of digital memories respectively included in the time-base correctors 208 and 262. The oscillator 278 has a relatively long time constant AFPC, so as to generate stable clocking signals that track long-time-average variations in the time-base of played back signals. The oscillator 278 generates oscillations of a frequency nominally the same as the oscillations of the oscillator 278. The frequency of the oscillations generated by the oscillator 278 is divided to obtain the feedback signal that is compared in the oscillator 278 AFPC circuitry to the horizontal synchronizing pulses separated by the sync separator 218 in order to generate an error signal for locking the oscillations to the high harmonic of line frequency.

The operation of the time-base correctors 208, 262 and of the AFPC'D oscillators 276 and 278 is explained in greater detail in U.S. Pat. No. 5,218,580 issued on 8 Jun. 1993 to Jung Wan Ko et al. based on their application Ser. No. 861,580 filed on 1 Apr. 1992 as a continuation of their application Ser. No. 839,542 filed on 24 Feb. 1992, entitled NERVOUS CLOCK SIGNAL GENERATOR FOR VIDEO RECORDER and assigned to Samsung Electronics Co., Ltd.

The derivation of 629 Khz carrier from the AFPC'd oscillator 276 is explained in greater detail in that same patent.

The recorder 116 of FIG. 5 and the player 200 of FIG. 9 often are combined so as to use one tape transport. In less expensive VCRs, in which the capability of playback during recording is sacrificed, the elements 118, 120, 122, 124, 126, 128, 130, 132, 134, 136, 138, 150, 152, 154 and 158 of FIG. 5 can, through appropriate switching, be utilized as the elements 218, 220, 222, 224, 226, 228, 230, 232, 234, 236, 238, 250, 252, 254 and 258, respectively, of FIG. 9.

In VCRs which employ very low tape speeds time base stability is sometimes poor enough to impair separation of the PAC modulation sidebands from the chrominance sidebands by line-comb filtering. Choosing a PAC carrier frequency that is a lower-frequency multiple of horizontal scan line frequency, near 250 kHz, has been found to improve separation of the PAC modulation sidebands from the chrominance sidebands by line-comb filtering, but requires the use of line-locked oscillator in addition to the 3.58 MHz local color oscillator, both for recording and for playback. This practice is described generally in U.S. patent application Ser. No. 07/787,690 filed 4 Nov. 1991 by the inventors hereof and others and entitled "SYSTEM FOR RECORDING AND REPRODUCING A WIDE BANDWIDTH VIDEO SIGNAL VIA A NARROW BANDWIDTH MEDIUM".

One skilled in the art and acquainted with the foregoing description with regard to FIGS. 5–9 will be enabled to design many variants of the multiplexing of the G signal or signals related thereto into the modified VHS signals generally described in U.S. Pat. No. 5,113,262. For example, either of the M and G signals may modulate the PAC in polarity opposite from that specifically described. The recording of G or of –G signal in the second under signal causes a zero value of that signal to be associated with no reemphasis of highs, which may be desirable from a compatability standpoint when playing conventional VHS tapes on a VHS video tape machine modified for playing back tapes recorded with folded luma. Where this is not of concern, 1–G or G–1 signal can be encoded in the second under signal rather than G, and a 1+2G signal is readily derived from the 1–G or G–1 signal reproduced during playback. Indeed, the G or –G signal may have other values of offset combined therewith before recording, and the effect of that offset can be negated during playback. Recording a 0.5–G or G–0.5 signal and a suitably offset M signal will reduce the average modulation level of the second under signal, although the frame synchronization information for playback must then be recorded differently—e.g., as PAC bursts inserted into the second under signal during horizontal sync pulse times. To eliminate any effect of tape noise on the G signal regenerated during playback, the G signal can have a small positive offset added thereto before its recording, and the corresponding signal reproduced during playback can have the small positive offset removed by coring.

The broader claims which follow should be construed broadly, to include within their scope the many alternative ways of recording and reproducing the signal indicating the degree to which high-frequency luma was de-emphasized respective to low-frequency luma in the luminance signal supplied for recording.

What is claimed is:

1. A recording system for recording a luminance signal having a high frequency portion and a low frequency portion on a recording medium, said recording system comprising:

means for generating a control signal representative of an amplitude level of said high-frequency portion of said luminance signal;

means for reducing the amplitude level of said high-frequency portion of said luminance signal relative to said low frequency portion in response to said control signal, thereby generating a reduced-highs luminance signal; and means for generating a combined signal by combining said reduced-highs luminance signal with said control signal, and recording said combined signal on said recording medium.

2. The recording system of claim 1, wherein said generating means comprises:

means for separating said high-frequency portion of said luminance signal from said luminance signal; and means, responsive to said high-frequency portion of said luminance signal, for producing said control signal only when the amplitude level of said high-frequency portion of said luminance signal exceeds a predetermined threshold level.

3. The recording system of claim 2, wherein said means for separating said high-frequency portion from said luminance signal comprises a high pass filter.

4. The recording system of claim 1, wherein said means for reducing the amplitude level of said high-frequency portion of said luminance signal relative to said low-frequency portion comprises:

separating means for separating said high-frequency portion of said luminance signal from said low frequency-portion of said luminance signal;

scaling means for providing a scaled high-frequency portion of said luminance signal by scaling said high-frequency portion by a scaling factor related to said control signal; and means for combining said scaled high-frequency portion of said luminance signal and said low-frequency portion of said luminance signal to form said reduced-highs luminance signal.

5. The recording system of claim 4 wherein said separating means comprises:

a highpass filter responsive to said luminance signal to produce said high-frequency portion; and a subtractor for subtracting said high-frequency portion from said luminance signal to produce said low-frequency portion.

6. The recording system of claim 4 wherein said scaling means comprises a multiplier for multiplying said high-frequency portion by said scaling factor.

7. The recording system of claim 6 wherein said scaling means further comprises a function circuit, responsive to said control signal, for generating said scaling factor.

8. A system for recording a luminance signal on a recording medium, comprising:

circuitry for separating a high-frequency portion from said luminance signal;

circuitry, responsive to said high-frequency portion, for generating a control signal representative of the level of said high-frequency portion of said luminance signal only when the level of said high-frequency portion exceeds a predetermined threshold level;

circuitry responsive to said control signal for reducing the level of said high-frequency portion of said luminance signal respective to its low-frequency portion, thereby to generate a deemphasized luminance signal; and circuitry for combining the deemphasized luminance signal with said control signal and recording the combined signal on said medium, wherein said circuitry for generating said control signal comprises:

a rectifier, responsive to said high-frequency portion;

a corer, coupled to said rectifier, for responding only to signals exceeding said threshold level; and a lowpass filter, coupled to said corer, producing said control signal.

9. A system for recording a luminance signal on a recording medium, comprising:

circuitry for generating a control signal representative of the level of a high-frequency portion of said luminance signal;

circuitry for reducing the level of said high-frequency portion of said luminance signal respective to its low-frequency portion in response to said control signal, thereby to generate a deemphasized luminance signal, which level reducing circuitry comprises filter circuitry for separating a high-frequency portion of said luminance signal from a low-frequency portion, a multiplier for multiplying said high-frequency portion by a scaling factor related to said control signal, a function circuit for generating said scaling factor in response to said control signal, and circuitry for combining said scaled high-frequency portion and said low-frequency portion to form said deemphasized luminance signal; and circuitry for combining said deemphasized luminance signal with said control signal for recording on said medium, wherein:

said circuitry for generating a control signal is of a type generating said control signal so as to have a value G which varies from 0, when the level of said high-frequency portion is relatively small, to ½, when the level of said high-frequency portion is relatively large, and having intermediate values at intermediate levels of said high-frequency portion; and said function circuit produces a scaling factor (1–G) having a value which varies from 1, when the value of said control signal G is 0, to ½, when the value of said control signal is ½, and having intermediate values at intermediate values of said control signal G.

10. A reproducing system for reproducing a luminance signal having a high-frequency portion and a low-frequency portion from a recording medium containing a previously recorded combined signal representing a reduced-highs luminance signal and a control signal, said control signal being indicative of the reduction in an amplitude level of said high-frequency portion of said luminance signal when said reduced-highs luminance signal was generated therefrom, said reproducing system comprising:

means for reproducing said combined signal from said recording medium and separating said control signal and said reduced-highs luminance signal from said combined signal reproduced; and boosting means for boosting the amplitude level of said high-frequency portion of said reduced-highs luminance signal in response to said control signal to reproduce said luminance signal having said high-frequency portion restored to original amplitude levels relative to said low-frequency portion.

11. The reproducing system of claim 10, wherein said boosting means comprises:

separating means for separating said high-frequency portion of said reduced-highs luminance signal from said low-frequency portion of said reduced-highs luminance signal;

scaling means for generating a scaled high-frequency portion by scaling said high-frequency portion of said reduced-highs luminance signal by a scaling factor related to said control signal; and means for combining said scaled high frequency portion and said low-frequency portion to form said luminance signal having said high-frequency portion restored to original amplitude levels relative to said low-frequency portion.

12. The reproducing system of claim 11, wherein said separating means comprises:

a high pass filter responsive to said reduced-highs luminance signal to form said high-frequency portion of said reduced-highs luminance signal; and a subtractor for subtracting said said high-frequency portion of said reduced-highs luminance signal from said reduced-highs luminance signal to form said low-frequency portion of said reduced-highs luminance signal.

13. The reproducing system of claim 11 wherein said scaling means comprises a multiplier for multiplying said high-frequency portion by said scaling factor.

14. The reproducing system of claim 13 wherein said scaling means further comprises a function circuit, responsive to said control signal, for generating said scaling factor.

15. A system for reproducing a luminance signal from a medium containing a previously recorded combined deemphasized luminance signal and control signal, said control signal being descriptive of the deemphasis used for generating said deemphasized luminance signal from said luminance signal, said reproducing system comprising:

means for reproducing said combined signal from said medium;

separating circuitry receptive of said combined signal for separating said control signal and said deemphasized luminance signal; and high-frequency-boost circuitry for boosting the level of a high-frequency portion of said deemphasized luminance signal in response to said control signal to reproduce said luminance signal, said high-frequency-boost circuitry including filter circuitry for separating a high-frequency portion of said deemphasized luminance signal from a low-frequency portion, a multiplier for multiplying said high-frequency portion by a scaling factor related to said control signal, a function circuit for generating said scaling factor in response to said control signal, and circuitry for combining said scaled high-frequency portion and said low-frequency portion to reproduce said luminance signal—in which said system:

said separating circuitry produces a control signal having a value G which varies from 0, when the level of said high-frequency portion is to be boosted by a minimum amount, to ½, when the level of said high-frequency portion is to be boosted by a maximum amount, and having intermediate values when the level of the high-frequency portion is to be boosted by intermediate amounts; and said function circuit produces a scaling factor substantially equal to (1+2G), having a value which varies from 1, when the control signal value G is 0, to 2, when the control signal value G is ½, and having intermediate values at intermediate values of G.

16. A system for recording a luminance signal having a high-frequency portion and a low-frequency portion on a recording medium and playing back said luminance signal from said recording medium, comprising:

generating means for generating a control signal representative of an amplitude level of said high-frequency portion of said luminance signal;

level reducing means for reducing the amplitude level of said high-frequency portion of said luminance signal relative to said low-frequency portion in response to said control signal, thereby generating a reduced-highs luminance signal;

means for generating a combined signal by combining said reduced-highs luminance signal with said control signal, and recording said combined signal on said recording medium;

means for reproducing said combined signal recorded on said recording medium, and separating said control signal and said reduced-highs luminance signal from said combined signal reproduced from said recording medium; and level boosting means for boosting the amplitude level of said high frequency portion of said reduced-highs luminance signal reproduced from said recording medium in response to said control signal reproduced from said recording medium to reproduce said luminance signal having said high-frequency portion restored to original amplitude levels relative to said low-frequency portion.

17. The system for recording a luminance signal having a high-frequency portion and a low-frequency portion on a recording medium and playing back said luminance signal from said recording medium as claimed in claim 16, wherein said level reducing means comprises:

separating means for separating said high-frequency portion and said low-frequency portion from said luminance signal;

scaling means for providing a scaled high-frequency portion by scaling said high-frequency portion of said luminance signal by a scaling factor related to said control signal;

means for combining said scaled high-frequency portion and said low-frequency portion to produce said reduced-highs luminance signal.

18. The system for recording a luminance signal having a high-frequency portion and a low-frequency portion on a recording medium and playing back said luminance signal from said recording medium as claimed in claim 17, wherein said separating means comprises:

a highpass filter coupled to receive said luminance signal, for separating said high-frequency portion from said luminance signal; and a subtractor for subtracting said high-frequency portion of said luminance signal from said luminance signal to produce said low-frequency portion of said luminance signal.

19. The system for recording a luminance signal having a high-frequency portion and a low-frequency portion on a recording medium and playing back said luminance signal from said recording medium as claimed in claim 17, wherein said scaling means comprises:

a function circuit for generating said scaling factor in dependence upon said control signal; and a multiplier for multiplying said high-frequency portion by said scaling factor to produce said scaled high-frequency portion.

20. The system for recording a luminance signal having a high-frequency portion and a low-frequency portion on a recording medium and playing back said luminance signal from said recording medium as claimed in claim 16, wherein said level boosting means comprises:

separating means for separating said high-frequency portion and said low-frequency portion from said reduced-highs luminance signal reproduced from said recording medium;

scaling means for providing a scaled high-frequency portion by scaling said high-frequency portion of said reduced-highs luminance signal reproduced from said recording medium by a scaling factor related to said control signal reproduced from said recording medium; and means for combining said scaled high-frequency portion and said low-frequency portion to produce said luminance signal having said high-frequency portion restored to original amplitude levels relative to said low-frequency portion.

21. The system for recording a luminance signal having a high-frequency portion and a low-frequency portion on a recording medium and playing back said luminance signal from said recording medium as claimed in claim 20, wherein said separating means comprises:

a highpass filter coupled to receive said reduced-highs luminance signal, for separating said high-frequency portion of said reduced-highs luminance signal from said reduced-highs luminance signal; and a subtractor for subtracting said high-frequency portion of said reduced-highs luminance signal from said reduced-highs luminance signal to produce said low-frequency portion.

22. The system for recording a luminance signal having a high-frequency portion and a low-frequency portion on a recording medium and playing back said luminance signal from said recording medium as claimed in claim 20, wherein said scaling means comprises:

a function circuit for generating said scaling factor in dependence upon said control signal; and a multiplier for multiplying said high-frequency portion of said reduced-highs luminance signal by said scaling factor to produce said scaled high-frequency portion.

23. A system for recording a luminance signal on and playing back said luminance signal from a recording medium comprising:

a highpass filter coupled to receive said luminance signal, for separating the high-frequency portion from said luminance signal;

a rectifier coupled to said highpass filter, for providing a rectified high-frequency portion of said luminance signal by rectifying the high-frequency portion of said luminance signal;

a corer coupled to said rectifier, for responding only to those levels of said rectified high-frequency portion of said luminance signal that exceed a predetermined threshold level;

a lowpass filter, coupled to said corer, for producing a control signal representative of the level of the high-frequency portion of said luminance signal;

circuitry for reducing, in response to said control signal, the level of the high-frequency portion of said luminance signal respective to its low-frequency portion, thereby to generate a deemphasized luminance signal;

circuitry for combining the deemphasized luminance signal with said control signal;

means for recording the combined signal on said medium;

means for reproducing said combined signal from said medium;

circuitry, responsive to the reproduced combined signal, for separating therefrom a reproduced control signal and a reproduced deemphasized luminance signal; and circuitry for boosting the level of a high-frequency portion of said reproduced deemphasized luminance signal in response to said reproduced control signal to reproduce said luminance signal.

24. A system for recording a luminance signal on and playing back said luminance signal from a recording medium comprising:

circuitry for generating a control signal representative of the level of a high-frequency portion of said luminance signal;

circuitry for reducing, in response to said control signal, the level of the high-frequency portion of said luminance signal respective to its low-frequency portion, thereby to generate a deemphasized luminance signal;

circuitry for combining the deemphasized luminance signal with said control signal;

means for recording the combined signal on said medium;

means for reproducing said combined signal from said medium;

circuitry, responsive to the reproduced combined signal, for separating therefrom a reproduced control signal and a reproduced deemphasized luminance signal, said reproduced control signal having a value (G) which varies from 0, when the level of said high-frequency portion of said reproduced deemphasized luminance signal is to be boosted by a minimum amount, to ½, when the level of said high-frequency portion of said reproduced deemphasized luminance signal is to be boosted by a maximum amount, or having values between 0 and ½ when the level of said high-frequency portion of said reproduced deemphasized luminance signal is to be boosted by intermediate amounts between said maximum and minimum amounts;

frequency-selective filter circuitry for separating high-frequency and low-frequency portions of said reproduced deemphasized luminance signal;

circuitry for scaling said high-frequency portion of said reproduced deemphasized luminance signal by a scaling factor related to said reproduced control signal, said scaling factor having a value (1+2G) varying from 1, when the control signal value G is 0, to 2, when the control signal value G is ½, or having values between 1 and 2 when the value of said control signal is between 0 and ½; and circuitry for combining said scaled high-frequency portion and said low-frequency portion of said reproduced deemphasized luminance signal to reproduce said luminance, signal.

25. A video signal recording/playback system, comprising:

means for receiving a luminance signal and a chrominance signal, said luminance signal having high and low frequency portions of a full bandwidth;

means for generating a control signal representative of an amplitude level of a high-frequency portion of said luminance signal, said control signal generating means comprising:

high-pass filter means for providing the high-frequency portion of said luminance signal by high-pass filtering said luminance signal;

rectifier means for providing a rectified signal by rectifying the high-frequency portion of said luminance signal;

corer means for providing a threshold value signal by eliminating low amplitude edges of the rectified signal; and low-pass filter means for generating said control signal representative of the amplitude level of the high-frequency portion of said luminance signal by low-pass filtering said threshold value signal;

adaptive deemphasis means for producing a deemphasis luminance signal by variably reducing the amplitude level of the high-frequency portion of said luminance signal in dependence upon said control signal;

folding means for producing a folded luminance signal by folding the high-frequency portion onto a low-frequency portion of said deemphasis luminance signal;

means for producing a combined video signal by combining the folded luminance signal, the chrominance signal and the control signal, and recording the combined video signal onto a recording medium;

means for producing a reproduced video signal by reproducing the combined video signal recorded on said recording medium, and separating the reproduced video signal into a reproduced luminance signal, a reproduced control signal and a reproduced chrominance signal;

unfolding means for producing an unfolded luminance signal by unfolding the high-frequency portion from the low-frequency portion of the reproduced luminance signal; and adaptive reemphasis means for producing a reemphasis luminance signal by variably boosting the amplitude level of the high-frequency portion of said reproduced luminance signal in dependence upon said reproduced control signal.

26. The video signal recording/playback system as claimed in claim 25, wherein said adaptive deemphasis means comprises:

subtractor means for providing the low-frequency portion of said luminance signal by subtracting the high-frequency portion of said luminance signal from said luminance signal;

arithmetic function means coupled to receive said control signal, for providing a scaling factor having a value varying with the value of said control signal;

multiplier means for providing a multiplied signal by multiplying the high-frequency portion of said luminance signal with said scaling factor; and adder means for reducing the amplitude level of the high-frequency portion of said luminance signal by adding the multiplied signal with the low-frequency portion of said luminance signal.

27. The video signal recording/playback system as claimed in claim 25, wherein said adaptive reemphasis means comprises:

high-pass filter means for providing a reproduced high-frequency portion of said reproduced luminance signal by high-pass filtering said reproduced luminance signal;

subtractor means for providing a reproduced low-frequency portion of said reproduced luminance signal by subtracting the reproduced low-frequency portion from the reproduced luminance signal;

arithmetic function means coupled to receive said reproduced control signal, for providing a scaling factor having a value varying with the value of said reproduced control signal;

multiplier means for providing a multiplied signal by multiplying the reproduced high-frequency portion of said reproduced luminance signal with said scaling factor; and adder means for boosting the amplitude level of the reproduced high-frequency portion of said reproduced luminance signal by adding the multiplied signal with the low-frequency portion of said reproduced luminance signal.

28. A system for recording a luminance signal on and playing back said luminance signal from a recording medium, comprising:

first filter means for filtering said luminance signal to produce a high-frequency portion of said luminance signal;

means for eliminating low amplitude edges of the high-frequency portion of said luminance signal to produce a threshold value signal;

second filter means for filtering said threshold value signal to produce a control signal representative of the amplitude level of the high-frequency portion of said luminance signal;

means for reducing the amplitude level of said high-frequency portion in response to said control signal;

means for combining the reduced level luminance signal with said control signal and recording the combined signal on said recording medium;

means for reproducing said combined signal from said recording medium and separating said control signal from said reduced level luminance signal; and means for boosting the amplitude level of a high-frequency portion of said reduced level luminance signal in response to said control signal to provide a reproduced luminance signal.

29. The system as claimed in claim 28, wherein said level reducing means comprises:

subtractor means for providing a low-frequency portion of said luminance signal by subtracting the high-frequency portion of said luminance signal from said luminance signal;

arithmetic function means coupled to receive said control signal, for providing a scaling factor having a value varying with the value of said control signal;

multiplier means for providing a multiplied signal by multiplying the high-frequency portion of said luminance signal with said scaling factor; and adder means for reducing the amplitude level of the high-frequency portion of said luminance signal by adding the multiplied signal with the low-frequency portion of said luminance signal.

30. The system as claimed in claim 28, wherein said arithmetic function means produces the scaling factor having the value of 1, ½ and ¼, respectively, when the value of said control signal is 0, ½ and ¼, respectively.

31. The system as claimed in claim 28, wherein said level boosting means comprises:

high-pass filter means for providing reproduced high-frequency portion of said reduced level luminance signal by high-pass filtering said reduced level luminance signal;

subtractor means for providing reproduced low-frequency portion of said reduced level luminance signal by subtracting the reproduced low-frequency portion of said luminance signal from the reduced level luminance signal;

arithmetic function means coupled to receive said control signal, for providing a scaling factor having a value varying with the value of said control signal;

multiplier means for providing a multiplied signal by multiplying the reproduced high-frequency portion of said reduced level luminance signal with said scaling factor; and adder means for boosting the amplitude level of the reproduced high-frequency portion of said reduced level luminance signal by adding the multiplied signal with the low-frequency portion of said reduced level luminance signal.

* * * * *